United States Patent [19]

Kircus

[11] 4,328,790
[45] May 11, 1982

[54] INSULATED INFLATABLE SOLAR COLLECTOR WITH STRENGTHENING MATRIX CONFIGURATION

[76] Inventor: John D. Kircus, 1226 Francais Dr., Shreveport, La. 71118

[21] Appl. No.: 139,682

[22] Filed: Apr. 14, 1980

[51] Int. Cl.³ .............................................. F24J 3/02
[52] U.S. Cl. .................................... 126/426; 126/416; 126/417; 126/448
[58] Field of Search ............... 126/415, 416, 426, 444, 126/448, 450; 4/493, 494, 498, 499

[56] References Cited

U.S. PATENT DOCUMENTS

| | | | |
|---|---|---|---|
| 3,022,781 | 2/1962 | Andrassy | 126/426 |
| 3,949,095 | 4/1976 | Pelehach et al. | 126/426 X |
| 4,033,326 | 7/1977 | Leitner | 126/415 |
| 4,059,095 | 11/1977 | Grundmann et al. | 126/426 X |
| 4,079,726 | 3/1978 | Voelker | 126/415 |
| 4,103,368 | 8/1978 | Lockshaw | 4/493 X |
| 4,146,012 | 3/1979 | Elkins et al. | 126/426 X |
| 4,151,830 | 5/1979 | Crombie et al. | 126/426 |
| 4,256,087 | 3/1981 | Sowers | 126/426 X |

Primary Examiner—Larry Jones
Attorney, Agent, or Firm—Watson, Cole, Grindle & Watson

[57] ABSTRACT

An inflatable solar collector which includes two interconnected flexible plastic sheets that define therebetween a manifold having multiple parallel fluid medium flow channels, and multiple flexible plastic covering sheets which are interconnected with either the respective manifold-forming sheets or with themselves to define multiple insulation zones on the top and bottom of the manifold. The flexible plastic covering sheets are suitably connected both at their peripheries and along interior lines to either the manifold-forming sheets or to each other to create a matrix construction for the collector that will provide great strength when the collector is inflated. Fluid medium inlet and outlet tubes are sealingly connected to communicate with diagonal opposite sides of the manifold.

6 Claims, 7 Drawing Figures

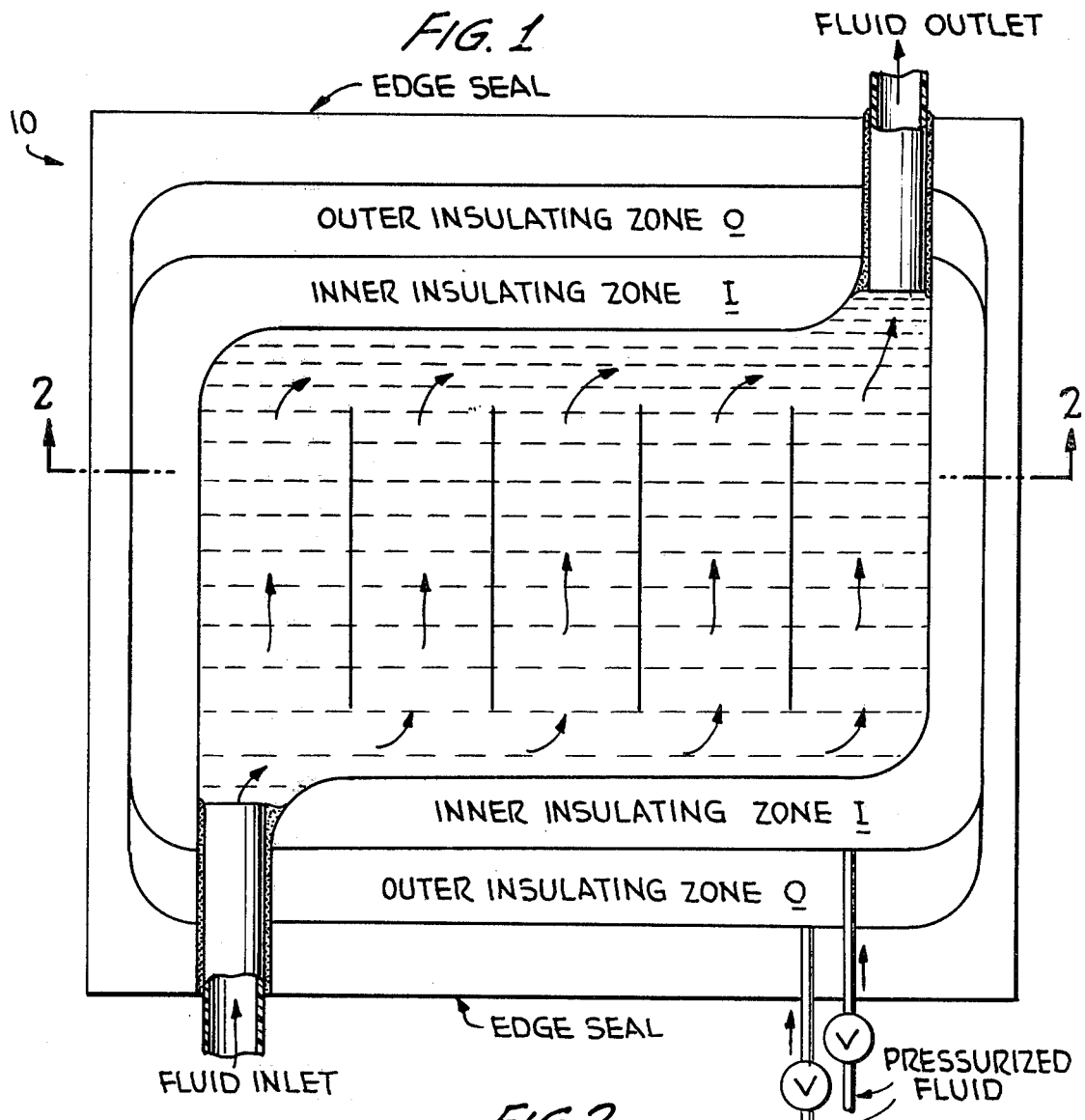
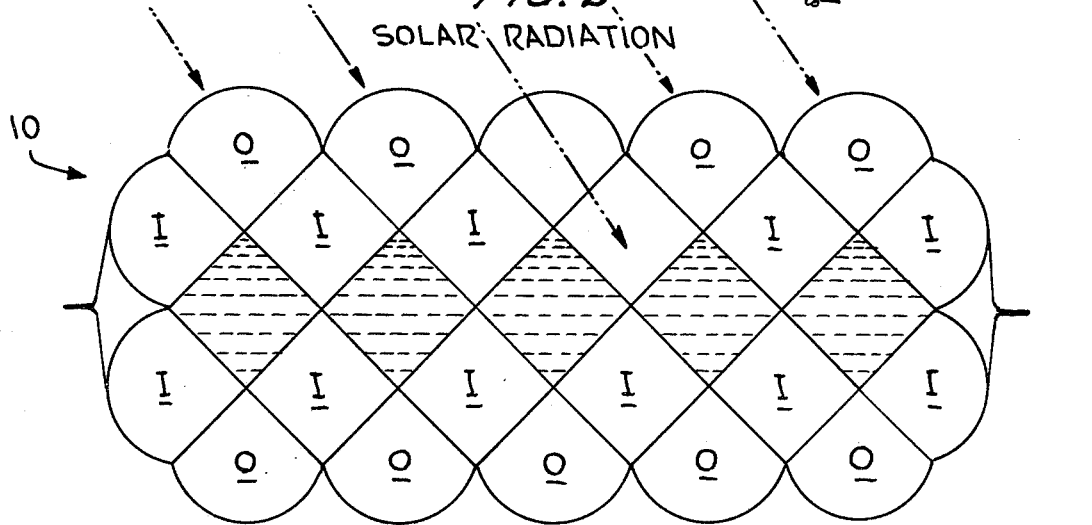

INSULATED INFLATABLE SOLAR COLLECTOR WITH STRENGTHENING MATRIX CONFIGURATION

BACKGROUND OF THE INVENTION

1. Field of the Invention

The present invention relates to solar collectors, and more specifically to inflatable solar collectors which have fluid flow channels formed therein through which a fluid medium may pass and be heated, i.e., when the collector is inflated and placed in the sun.

2. The Prior Art

Inflatable solar collectors which are constructed using flexible sheet materials and which can be used to heat a fluid medium passing therethrough have been well known for many years. Indeed, many patents are available which describe various types and configurations of such solar collectors; however, none are as easy and inexpensive to manufacture, or as strong in construction as the inflatable solar collectors constructed in accordance with the present invention.

One type of prior art inflatable solar collector is shown in Andrassy, U.S. Pat. No. 3,022,781. The solar collector described in this patent includes two generally rectangularly shaped layers of flexible plastic film which are joined near their peripheries, as well as along parallel portions of their interiors, such that they together form a manifold through which a liquid medium such as water can be passed. Thus water, which is delivered to the manifold via a separate inlet tube, is caused to follow a serpentine flow path as shown in FIG. 1, although other types of flow paths are also contemplated. One of the two manifold-forming plastic film lyers is either pigmented with a radiant energy-absorbent material, or else is coated with such a material, whereas the other layer is transparent, i.e., so as to allow the sun's rays to pass therethrough (this latter layer being the intended "top" layer). The two layers, in addition to being joined near their peripheries and interiorly so as to form the noted fluid flow paths, are suitably joined again along portions of their peripheries so as to create a hem-like space with the other peripheral connection in which respective rods can be inserted so as to provide a rigidity to the four sides of the collector. The collector is inflated by the addition of fluid medium between the two joined flexible plastic film layers. Although it is mentioned that top and bottom insulating spaces can be provided using flexible materials to prevent heat losses, no practical embodiment of such an embodiment is shown or further discussed. Another type of solar collector which is quite similar to that shown in Andrassy is shown in Heitland et al, U.S. Pat. No. 4,143,644.

In Crombie et al, U.S. Pat. No. 4,151,830, an inflatable solar collector is shown which includes a multiplicity of flexible plastic layers which are suitably connected so as to form, in effect, separate lower and upper fluid flow pathways that are each insulated from the surrounding atmosphere. Thus, as shown in FIG. 2, a first fluid flow pathway is created between plastic layers 18 and 19 which are joined internally of their joined peripheries to form a serpentine fluid flow path, and a secondary "return" fluid flow pathway is created between layers 19 and 25, the fluid medium to be heated passing from one path to the other via agitators 20 and valve means 22. Layer 19, and optionally layer 18, are pigmented to absorb solar energy, whereas layer 25 is transparent. The first fluid flow pathway is insulated from the surrounding atmosphere by an insulating air space created between bottom flexible plastic layers 14 and 15, which layers are connected together not only at their peripheries but also at interior portions designated 17; however, they are not connected inwardly of their peripheries to the bottommost layer 18, which layer defines the bottom of the first fluid flow pathway. The secondary fluid flow pathway is insulated from the surrounding atmosphere by an insulating air space created between a top flexible plastic layer 26 and the noted layer 25, layer 26 being transparent to solar radiation and connected not only at its periphery to the periphery of layer 25 but also along lines inwardly thereof as indicated by 27 in FIG. 2. However, no matrix interconnection of multiple flexible plastic layers used for creating multiple insulating air spaces on opposite sides of the fluid flow paths is disclosed.

A further type of inflatable solar collector is shown in Grundmann, U.S. Pat. No. 4,059,095. In this invention two flexible foils are joined at their peripheries as well as along parallel interior portions to form a serpentine fluid flow path for a fluid medium to be passed therethrough and heated, the lower foil being darkened so as to absorb solar radiation and the upper foil being transparent so as to transmit solar radiation. Additional upper and lower foils 32 and 33 can be used to form insulating air chambers around the fluid flow paths formed between foils 30 and 31 (see FIG. 3); however, likewise to the situation in the Crombie patent, no matrix interconnection of multiple flexible plastic layers for creating multiple insulating air spaces on opposite sides of the fluid flow paths is disclosed.

It is an object of the present invention to provide an inflatable solar collector which is not only fabricated using sheets of flexible plastic and which is formed to provide an interior manifold for the flow of fluid medium therethrough, but which is better insulated from the temperatures of the surrounding atmosphere, which is easier and less expensive to manufacture than prior art solar collectors, and which when inflated will provide a product having an extremely strong construction.

SUMMARY OF THE PRESENT INVENTION

According to the present invention the inflatable solar collector includes not only upper and lower flexible plastic manifold-forming layers which are suitably joined near their peripheries and along parallel portions of their interiors so as to create flow channels therebetween for a flowing fluid medium, but it also includes multiple flexible plastic covering layers located both on top of the upper manifold-forming plastic layer and underneath the lower manifold-forming plastic layer so as to form multiple protective insulating zones around the fluid manifold, thus protecting the fluid medium flowing through the fluid manifold from the cold atmospheric temperatures around the solar collector which will be present when the solar collector is used in cold climates or during the winter season. These flexible plastic covering layers are not only appropriately connected near their peripheries to either the manifold-forming layers or to each other, but are joined interiorly of their peripheries to adjacent respective layers so as to form an overall matrix construction, thus providing greatly enhanced strength characteristics for the collector as a whole. All of the flexible plastic sheets used to form the solar collector are of an essentially uniform shape and can be easily joined together in sequential fashion by a suitable mechanical device such that the manufacturing of the solar collector is easy and inexpensive. Plastic tubes are sealingly connected between the various flexible plastic sheets during the process of their interconnection so as to form integral conduits for the flow of fluid medium into and out of the manifold, as well as to form passageways for inflation of the various insulating zones with pressure fluid. Both the upper manifold-forming layer and all of the covering layers positioned on the top of the upper manifold-forming layer are of course transparent to solar radiation so as to allow the solar radiation to pass therethrough and heat the fluid medium passing through the fluid manifold therebelow.

The invention will now be better understood by reference to the accompanying drawings and the following related discussion.

DESCRIPTION OF THE DRAWINGS

In the drawings,

FIG. 1 depicts a diagrammatic top view of one embodiment of inflatable solar collector constructed in accordance with the present invention, the view showing the flow of fluid medium to be heated through the inflated solar collector and the various insulating zones which surround the sides of the solar collector;

FIG. 2 depicts a diagrammatic sectional side view taken along line 2—2 of the embodiment of inflatable solar collector shown in FIG. 1, the view showing the relationship between the fluid flow channels and the various insulating zones which are located on top of and beneath the fluid flow channels;

DETAILED DESCRIPTION OF THE PREFERRED EMBODIMENT

Figure 3:
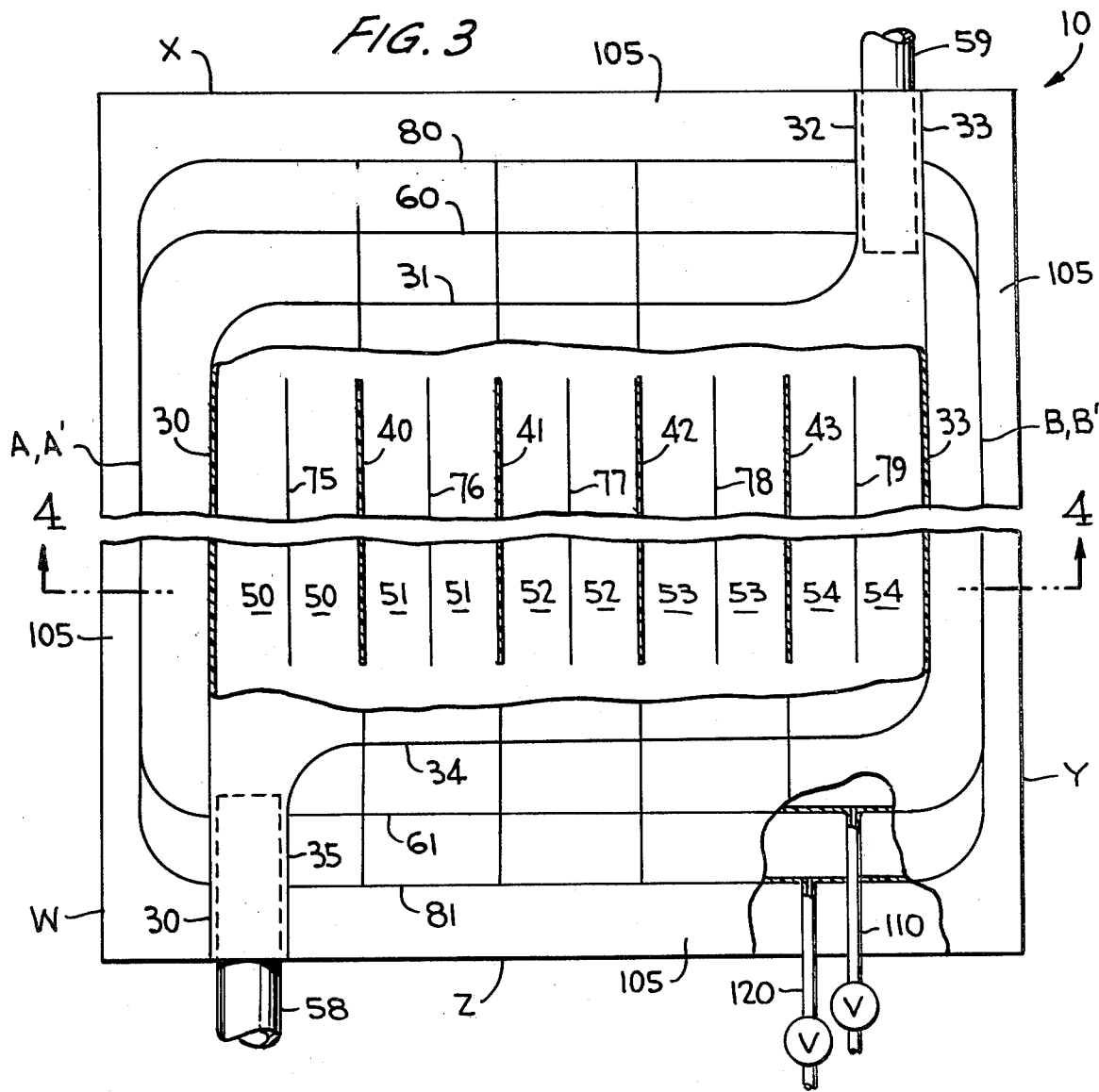
FIG. 3 shows a top view, partially broken away, of a similar embodiment of inventive inflatable solar collector, all the various elements being identified with reference numerals.
Figure 4:
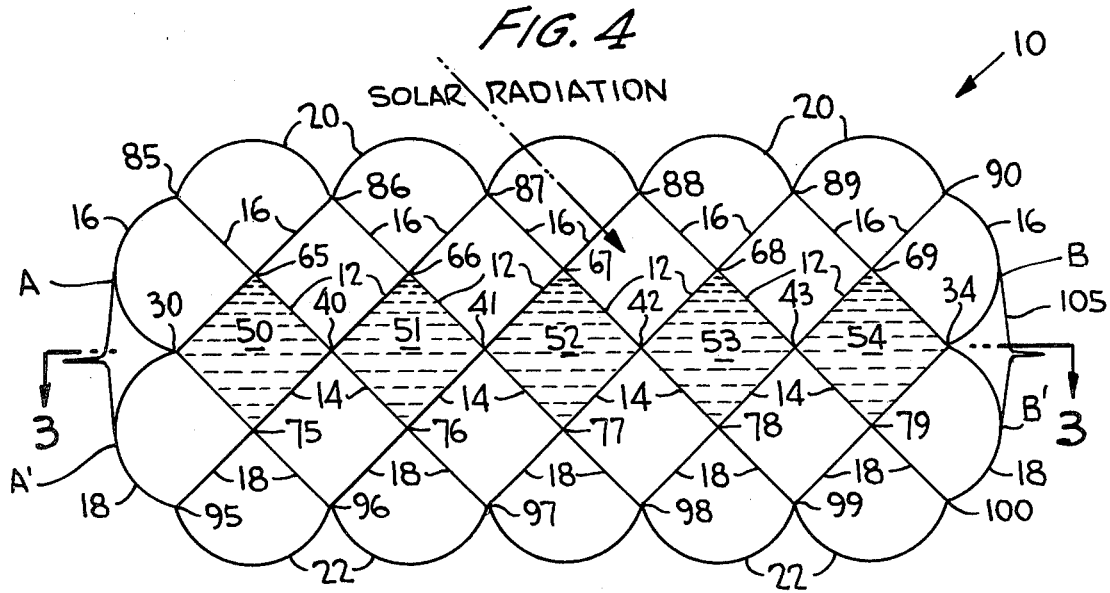
FIG. 4 shows a sectional side view of the inflated solar collector shown in FIG. 3, the view being taken along line 4—4 of FIG. 3.

One embodiment of an inflatable solar collector constructed in accordance with the present invention is depicted in FIGS. 3 and 4, with the function and features thereof being diagrammatically shown in FIGS. 1 and 2. Among the various figures like numerals refer to like structural elements.

The inflatable solar collector, generally indicated by numeral 10, is seen to include an internal fluid medium manifold which is constructed to define a number of parallel fluid medium flow channels which act to direct fluid medium fed to the solar collector from a fluid medium inlet conduit to a diametrically opposed fluid medium outlet conduit, the manifold being protected from the surrounding atmosphere by multiple top and bottom insulating zones located therearound. Since all of the flexible plastic sheets which form the upper half of the solar collector are formed of transparent plastic materials, and more specifically, of plastic materials which display not only a high solar transparency, but also high strength, low heat emissivity and high ultra violet radiation resistance, solar radiation is allowed to pass through the top insulation zones on the top side of the solar collector so as to heat the fluid medium passing through the flow channels of the internal fluid medium manifold, yet concurrently retard conductive heat loss from the heated fluid medium. The flexible plastic sheets which form the lower half of the fluid manifold will be either transparent similarly to the sheets of the upper half, e.g., when the solar collector is to have a darkened fluid medium passed therethrough, or, at least the sheet which forms the bottom of the fluid manifold will be darkened by (or coated with) a solar radiation absorption agent to maximize heating of the fluid medium passing thereabove, e.g., when the solar collector is to have a clear fluid medium passed therethrough. Relatively small pressure fluid inlet tubes are sealingly connected between the sheets forming the respective insulation zones so as to allow inflation thereof, such that once inflated, the condition shown in FIG. 2 will be achieved. Such pressure fluids can be either clear or opaque insulating liquids or gases, the most preferred fluid being air.

Figure 5:
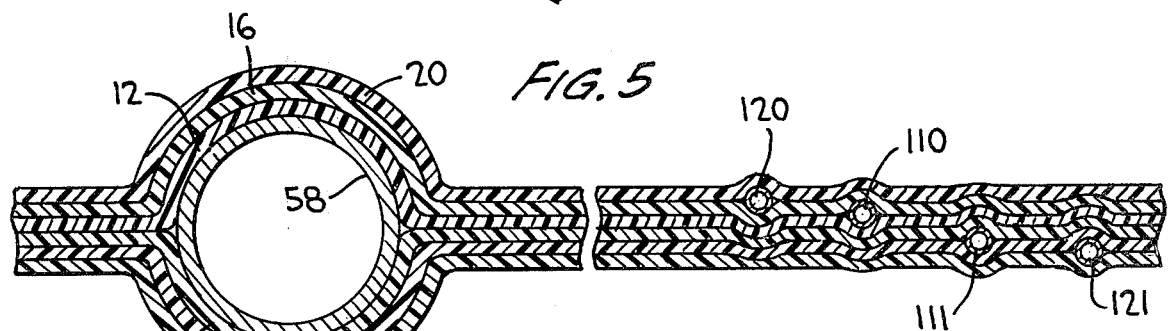
FIG. 5 shows, on an enlarged scale, a portion of a sectional view of another specific embodiment of an inflatable solar collector of the present invention, the view being taken through an edge seal portion on a side of the collector which includes the fluid medium inlet tube and the pressurized fluid inlet tubes.

Considering the elements which make up the inventive solar collector in more detail, and as shown in FIGS. 3, 4 and 5, the solar collector is composed of an upper manifold-forming sheet 12, a lower manifold-forming sheet 14, a first top covering sheet 16 (located above the upper side of the upper manifold-forming sheet 12), a first bottom covering sheet 18 (located beneath the lower side of the lower manifold-forming sheet 14), a second top covering sheet 20 (located above the upper side of the first covering sheet 16), and a second bottom covering sheet 22 (located beneath the lower side of first bottom covering sheet 18). Sheets 12, 16 and 20 are preferably formed of a clear flexible plastic material, whereas sheet 14, as well as possibly sheets 18 and 22 are preferably formed of flexible plastic sheets which either contain dark, radiation-absorbing materials therein, or else one or more coatings of radiation-absorbing paints. The six sheets, along with other attendant elements, are suitably and sequentially connected together by mechanical means, either by heat sealing or adhesives, to form the inflatable solar collector of the invention. The area between manifold-forming sheets 12 and 14 provides the internal fluid medium manifold through which fluid medium will flow as shown by the arrows in FIG. 1, and the areas between each of the manifold-forming sheets and their adjacent first covering sheets form the top and bottom inner insulating zones I, and the areas between the first covering sheets and the adjacent second covering sheets form the top and bottom outer insulating zones 0 (see FIG. 2).

Figure 7:
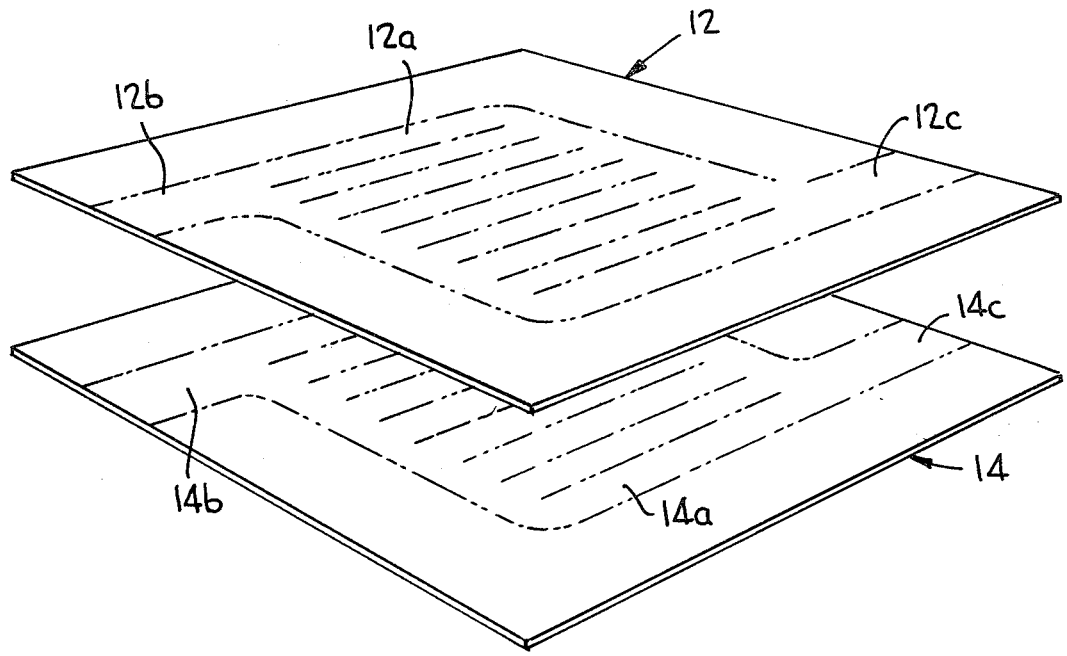
FIG. 7 shows an exploded view of schematic representations of the upper and lower manifold-forming sheets which, when suitably joined, form not only the manifold portion of the inventive solar collector, but also the extension portions which form transition areas between the portions of ends of fluid medium inlet and outlet tubes (not shown) and the manifold portion.

The inventive solar collector can be easily and inexpensively manufactured in a stepwise fashion as follows:

First two identically shaped rectangular plastic sheets 12 and 14 are contiguously positioned together (shown in exploded view in FIG. 7) so as to be separated only by the ends of a fluid medium inlet tube 58 and a fluid medium outlet tube 59 which are positioned between the sheets near opposite diagonal corners thereof. Then the two sheets are pressed together (by means not shown) so as to be bonded together via application of heat and pressure along not only their contiguous outer peripheries but also along inner lines extending generally parallel to the outer peripheries, as well as along interior, spaced apart lines which extend in parallel with the disposition of the fluid medium inlet and outlet tubes 58 and 59. These bonding lines are respectively indicated in FIG. 3 as outer peripheral lines W, X, Y and Z; inner lines 30, 31, 32, 33, 34 and 35; and interior, spaced apart lines 40, 41, 42 and 43. The manifold-forming portions of the sheets 12 and 14 which fall within the bonding lines 30, 31, 33 and 34 are indicated in FIG. 7 as portions 12a and 14a, whereas the extension portions of the two sheets which are defined between bonding lines 30, 35, 32 and 33, and which are sealingly connected together and to the outer surfaces of the fluid medium inlet and outlet tubes 58 and 59, are indicated in FIG. 7 as portions 12b, 12c, 14b and 14c. These portions actually form transition areas between the ends of the fluid medium inlet and outlet tubes and the fluid medium manifold portion.

Next, the first flexible plastic top and bottom covering sheets 16 and 14, which have identical and rectangular shapes, are respectively positioned on top of the upper manifold-forming sheet 12 and beneath the lower manifold-forming sheet 14. Separate pressure fluid inlet tubes 110 and 111 (see FIG. 5) are then respectively placed between the first top covering sheet 16 and the upper manifold-forming sheet 12 and between the first bottom covering sheet 18 and the lower manifold-forming sheet 14. Thereafter, by means (not shown), the covering sheets 16 and 18 are suitably bonded to the respective adjacent upper and lower manifold-forming sheets 12 and 14, as well as to the outer surfaces of pressure fluid inlet tubes 110 and 111, and fluid medium inlet and outlet tubes 58 and 59. The bondings will occur at the outer peripheries of sheets 16 and 18 along bonding lines W, X, Y and Z; along inner bonding lines A, 60, B, 61 and A', 60', B', 61' (see FIGS. 3 and 4); and along interior, spaced apart bonding lines 65, 66, 67, 68 and 69, and 75, 76, 77, 78 and 79, these interior lines being parallel to bonding lines 65–69 and positioned halfway between vertical planes passing through bonding lines 30, 40, 41, 42, 43 and 33.

Finally, the second flexible plastic top and bottom covering sheets 20 and 22, which have identical rectangular shapes, are respectively positioned on top of the first top covering sheet 16 and beneath the first bottom covering sheet 18. In addition, separate pressure fluid inlet tubes 120 and 121 are respectively placed between the second top covering sheet 20 and the first top covering sheet 16 and between the second bottom covering sheet 22 and the first bottom covering sheet 18. Then, by means (not shown), the covering sheets 20 and 22 are suitably bonded to the respective adjacent first top covering sheet 16 and the first bottom covering sheet 18, as well as to the outer surfaces of pressure fluid inlet tubes 120 and 121, and fluid medium inlet and outlet tubes 58 and 59. The bondings will occur at the outer peripheries of sheets 20 and 22 along bonding lines W, X, Y and Z; along inner bonding lines A, 80, B, 81, and A', 80', B', 81'; and along interior, spaced apart bonding lines 85, 86, 87, 88, 89, 90 and 95, 96, 97, 98, 99, 100, these interior, spaced apart lines extending parallel to vertical planes passing through bonding lines 30, 40, 41, 44, 43 and 33.

Figure 6:
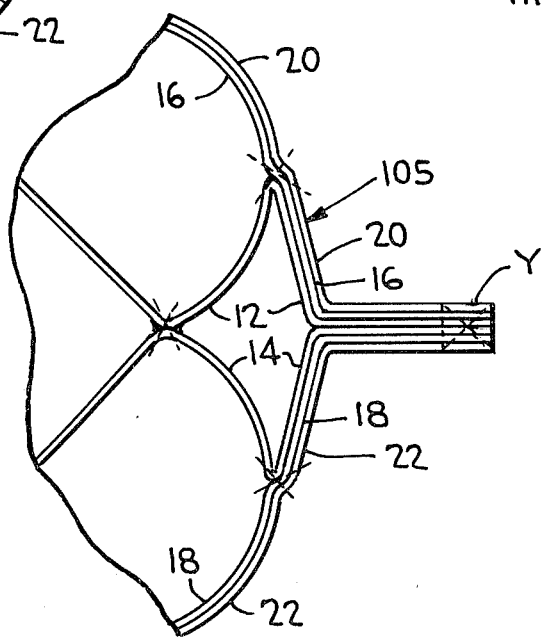
FIG. 6 shows on a similarly enlarged scale a partial sectional view of the side of the inflatable solar collector shown in FIG. 4, the view showing the bondings between the various flexible plastic sheets at and near their peripheries.

A sectional view of the peripheral edge 105 of the interconnected sheets is shown in FIG. 6.

It should be noted that the use of one or the other of pressure fluid inlet tubes 110 and 111 or 120 and 121 can be dispensed with during construction of the solar collector provided that suitable perforations are made to connect the interiors of the top and bottom inner insulation zones and the top and bottom outer insulation zones. It should also be noted that the pressure fluid inlet tubes can include valves in order to control the pressure fluid flow therethrough as desired.

The formed inventive inflatable solar collector, which may be rolled up when deflated and stored, can be spread out on a generally flat surface when ready for use, and by pumping transparent pressure fluid medium through tubes 110, 111, 120 and 121, the inner top and bottom insulation zones and the outer top and bottom insulation zones will fill up and expand such that the inflated condition of the collector will be achieved generally as shown in the cross sectional views in FIGS. 2 and 4. The fluid inlet and outlet conduits 58 and 59 can then be connected to suitable means for supplying and removing fluid medium to be heated, and the fluid medium caused to pass through the parallel fluid channels 50, 51, 52, 53 and 54 created in the fluid manifold. If the solar collector is positioned in the sun's rays, the fluid passing through the manifold will be suitably heated.

The matrix configuration of the solar collector which is created by the specific linearly extending bonding lines between all of the various plastic sheets provides the inflated device with great strength and rigidity. The number of insulating zones in the solar collector, which have been herein shown to comprise top and bottom inner insulating zones and top and bottom outer insulating zones, could be expanded to include additional zones simply by using and suitably connecting to the outermost sheets any desired number of additional flexible plastic cover sheets, these additional zones further helping prevent conductive cooling of the heated fluid medium passing through the manifold of the solar collector, i.e., when the solar collector is located in a cold environment.

The inventive inflatable solar collector can be easily mass produced on a "printing press" type high speed fabrication machine such that the manual steps needed during the manufacturing process can be limited to deployment of the plastic sheets and proper insertion of the various tubes between the various flexible plastic sheets. Thus the final product can be relatively inexpensively manufactured and therefore low in cost to the ultimate purchaser.

Multiple inventive solar collectors when inflated can be connected together to form a chain of collectors, not only to achieve enhanced heating of the fluid medium therethrough but for other purposes as well, such as the concurrent insulating objects shown in U.S. Pat. No. 3,949,095.

While various contemplated embodiments of the invention have been shown and described, it is obvious that various changes and modifications could be made therein and still be within the scope of the described invention.

I claim:

1. An inflatable solar collector through which a fluid medium can flow so as to be heated by solar radiation and which is constructed to prevent heat loss from the heated fluid medium flowing therethrough to the surrounding atmosphere, and which has a strong matrix construction and is easily manufactured, said collector comprising:

an upper flexible plastic manifold-forming sheet and a lower flexible plastic manifold-forming sheet, said upper and lower manifold-forming sheets being correspondingly shaped and sealingly joined at their peripheries and also joined along parallel portions of their interiors so as to form a manifold therebetween defining multiple parallel fluid medium flow channels, means for supplying fluid medium to be heated to one side of the parallel fluid medium flow channels in said manifold and means for removing heated fluid medium from the other side of the parallel fluid medium flow channels in said manifold, first flexible plastic covering sheets respectively positioned on top of said upper flexible plastic manifold-forming sheet and beneath said lower flexible plastic manifold-forming sheet, said first covering sheets being connected to said upper and lower manifold-forming sheets to form inner inflatable insulating zones around said manifold, second flexible plastic covering sheets respectively positioned on top of said first flexible plastic covering sheet located on top of said upper flexible plastic manifold-forming sheet and beneath said first flexible plastic covering sheet located beneath said lower flexible plastic manifold-forming sheet, said second covering sheets being connected to said first covering sheets to form outer inflatable insulating zones around said manifold, separate means for supplying pressure fluid to inflate said inner and outer insulating zones, and wherein all of said flexible plastic sheets are joined at their contiguous peripheries; wherein said first flexible plastic covering sheets are respectively connected to said upper and lower flexible plastic manifold-forming sheets along interior lines which extend parallel to the connection lines joining said upper and lower flexible plastic manifold-forming sheets and halfway between planes extending vertically through said connection lines, and wherein said second flexible plastic covering sheets are respectively connected to said first flexible plastic covering sheets along interior lines which extend in planes which extend vertically through said connection lines so as to create a strengthening matrix configuration for said solar collector when inflated.

2. The inflatable solar collector as claimed in claim 1 wherein said upper flexible plastic manifold-forming sheet and the two flexible plastic covering sheets located on top thereof are formed of clear plastic.

3. The inflatable solar collector as claimed in claim 2 wherein said lower flexible plastic manifold-forming sheet contains radiation-absorbing materials therein.

4. The inflatable solar collector as claimed in claim 2 wherein said lower flexible plastic manifold-forming sheet has coatings of radiation-absorbing materials thereon.

5. The inflatable solar collector as claimed in claim 1 wherein said upper and lower flexible plastic manifold-forming sheets include portions which form transition areas with said means for supplying and means for delivering fluid medium to and away from said fluid medium manifold.

6. The inflatable solar collector of claim 1 wherein said separate means for supplying pressure fluid to inflate said inner and outer insulating zones comprise four tubes: a first tube sealingly connected between said upper flexible plastic manifold-forming sheet and the first flexible plastic covering sheet on top thereof, a second tube sealingly connected between said first flexible plastic covering sheet on top of said upper manifold-forming sheet and the second flexible plastic covering sheet on top thereof, a third tube sealingly connected between said lower flexible plastic manifold-forming sheet and the first flexible plastic covering sheet therebeneath, and a fourth tube sealingly connected between said first flexible plastic covering sheet beneath said lower manifold-forming sheet and the second flexible plastic covering sheet therebeneath.

* * * * *